United States Patent [19]
Hayner

[11] 3,732,887
[45] May 15, 1973

[54] FLOW-PRESSURE CONTROL VALVE SYSTEM

[75] Inventor: Paul F. Hayner, Lexington, Mass.

[73] Assignee: Sanders Associates, Inc., Nashua, N.H.

[22] Filed: Oct. 12, 1971

[21] Appl. No.: 188,283

[52] U.S. Cl..............................137/486, 137/487.5
[51] Int. Cl. ...........................................G05d 16/06
[58] Field of Search..................137/486, 485, 487.5, 137/488, 489.5, 492, 495, 501, 487; 251/118; 137/82, 625.62

[56] References Cited

UNITED STATES PATENTS

| | | | |
|---|---|---|---|
| 3,351,085 | 11/1967 | Allingham | 137/495 |
| 2,765,800 | 10/1956 | Drake | 137/486 X |
| 2,984,251 | 5/1961 | Quinby | 137/487.5 X |
| 3,143,134 | 8/1964 | Karpis | 137/486 |
| 3,159,178 | 12/1964 | Adams | 137/501 |

Primary Examiner—Henry T. Klinksiek
Assistant Examiner—Robert J. Miller
Attorney—Louis Etlinger

[57] ABSTRACT

A valve system is disclosed in which a main control valve is controlled by either one of two pilot stages. Each stage operates to control the main valve to make one condition of the output follow a corresponding input signal closely. Control of the main valve may be transferred from one to the other pilot stage either manually or automatically. In one embodiment, transfer occurs as the magnitude of one of the conditions reaches a predetermined threshold.

16 Claims, 5 Drawing Figures

FLOW-PRESSURE CONTROL VALVE SYSTEM

FIELD OF THE INVENTION

This invention relates generally to valve systems and particularly to such systems which control the flow of fluid to an actuator in accordance with an input signal.

BACKGROUND OF THE INVENTION

A typical control valve system comprises an electrical transducer which receives an input signal and, in response thereto, controls a first stage of the system. This first stage, or pilot stage, or hydraulic amplifier, in turn controls a second stage, or main valve. The latter controls the flow of fluid to and/or from a hydraulic actuator or other useful load device.

Valves have been built in the past in which it has been attempted, with varying degrees of success, to hold one output condition constant regardless of the variation of another condition. For example, systems in which the object is to hold the rate of flow constant regardless of load pressure are illustrated in U.S. Pat. No. 3,126,031 issued Mar. 24, 1964 to P.F. Hayner and entitled Electro Hydraulic Servo Valve and in U.S. Pat. No. 3,561,488 issued Feb. 9, 1971 to J.O. Byers and entitled Fluid Flow Control Valve. As another example, a system in which the object is to hold the pressure across the load constant regardless of rate of flow is illustrated in U.S. Pat. No. 2,931,389 issued Apr. 5, 1960 to William C. Moog, Jr. and Lewis H. Geyer and entitled Servo Valve Producing Output Differential Pressure Independent of Flow Rate.

There is a need in industry for a control valve in which the output is at first controlled so that the rate of flow, or velocity, closely follows an input signal, regardless of load pressure variations, and is then controlled so that the pressure closely follows an input signal regardless of velocity variations. Such a need arises, for example, in connection with a die casting, injection molding or forging press operation wherein a steady and controlled velocity, i.e., rate of flow, is required until the charge has substantially filled all the cavities of the die, after which the pressure should be carefully controlled to rise to a predetermined maximum and be held there any desired length of time.

It is a general object of the present invention to provide an improved valve.

Another object is to provide a valve system in which the main control valve may be controlled by either one of two pilot stages.

Another object is to provide a valve in which either the output velocity or the output pressure can be controlled to follow an input signal closely.

A more specific object is to provide a valve in which the output velocity is controlled so as to follow an input signal closely until a predetermined pressure is attained after which the pressure is controlled automatically to rise gradually to a predetermined maximum where it may be held as long as desired.

SUMMARY OF THE INVENTION

A valve system incorporating the present invention includes first and second pilot stages which are selectively connectable through a transfer valve so that either may control the operation of the main control valve which in turn controls the flow of fluid to a load device. The first pilot stage receives a signal indicative of the desired variation of a first condition, such as velocity, while the second pilot stage receives a signal indicative of the desired variation of a second condition, such as pressure. Preferably signals indicative of the actual values of these two conditions are taken from the output of the main control valve and fed back to their respective pilot stages so that the output closely follows the parameter selected by the transfer valve.

In a more specific aspect of the invention, the first pilot stage is connected initially to control the velocity of the output until the pressure rises to a predetermined value whereupon the apparatus automatically transfers control to the second pilot stage which thereafter controls the output pressure in accordance with its input signal.

DESCRIPTION OF PREFERRED EMBODIMENT

For a clearer understanding of the invention, reference may be made to the following detailed description and the accompanying drawing in which.

Figure 1:
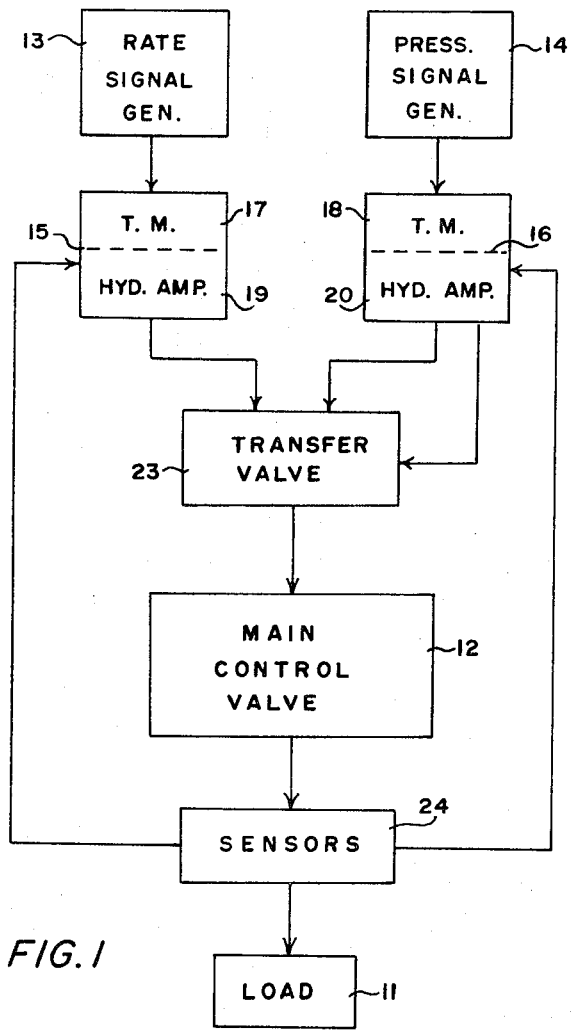
FIG. 1 is a block diagram of a system incorporating the invention.

Referring first to FIG. 1 there is shown a load device 11, such as a hydraulic ram or actuator, which is supplied with fluid under pressure under control of a main control valve 12. This valve may be a three way valve which controls the flow of fluid to and from the load 11 over a single hydraulic line or it may be a four way valve which controls the flow of fluid to and from the load 11 over two hydraulic conduits, each of which may carry fluid flowing in either direction. Also shown are two signal generators 13 and 14, the former of which generates a signal indicative of the desired rate of flow, that is, velocity, of fluid passing to the load 11 and the latter of which generates a signal indicative of the pressure which it is desired to maintain on the load 11. Each of the generators 13 and 14 may comprise either a manual arrangement or an automatic arrangement which generates the desired signals as a function of time. The signals generated by the generators 13 and 14 are passed to pilot stages 15 and 16 respectively which comprise torque motors 17 and 18 and hydraulic amplifiers 19 and 20 respectively. The outputs of both of the pilot stages 15 and 16 are connected to a transfer valve 23 which connects one or the other of the stages 15 and 16 to control the main valve 12. Interposed between the main control valve 12 and the load 11 are sensors, indicated generally by the reference character 24, which generates signals indicative of the rate of flow of fluid to the load 11 and the pressure exerted against the load 11. These signals are fed back to the pilot stages 15 and 16 respectively where they are in effect compared with the signals applied to these stages so as to generate error signals for application to the main control valve 12 so that the output thereof closely follows the input signal of whichever pilot stage is connected by means of the transfer valve 23.

Figure 2:
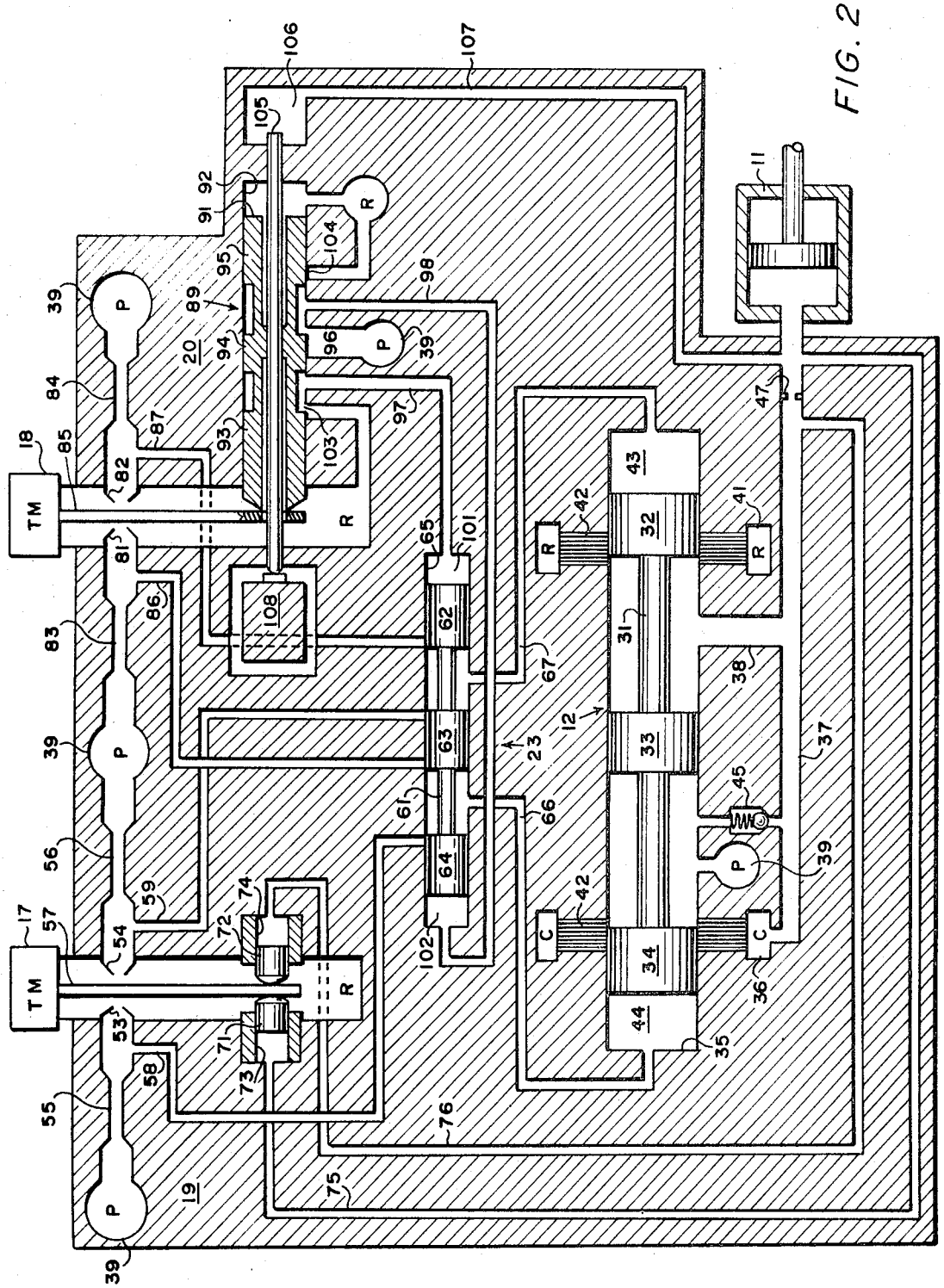
FIG. 2 is a schematic diagram of a preferred embodiment of the invention.

Referring now to FIG. 2 there is shown the load device 11 illustrated as a hydraulic ram. The main control valve 12 is shown, for illustrative purposes, as a three way valve including a spool 31 formed with lands 32, 33 and 34, disposed within a hollow cylinder 35. A control port 36 is connected by means of a conduit 37 to the load 11. A branch 38 of the conduit 37 communicates with the cylinder between the lands 32 and 33. A source 39 of fluid under pressure communicates with the cylinder between the lands 33 and 34. A port 41 communicates with the reservoir or return. Each of the ports 36 and 41 preferably includes a plurality of restrictors 42 such as small diameter pipes or a matrix of baffles formed on adjacent plates, so as to reduce the noise and erosion associated with the flow of fluid therethrough. However, such restrictors are not essential to the present invention and are well known and need not be further described.

The valve 12 is shown in FIG. 2 in its neutral position in which the lands 32 and 34 occlude the major portion of the ports 41 and 36 respectively but leave a portion of these ports exposed so that a certain amount of fluid can flow from the source 39, into the hollow cylinder and through the port 36, the conduits 37 and 38 and the port 41 to the return. The valve 12 includes end spaces 43 and 44 and, as well known, the differential pressure existing in these end spaces controls the position of the spool 31 and so as to increase or decrease the flow of fluid from the source 39 to the load 11. A check valve 45 is connected to allow fluid to flow from the conduit 37 to the space between the lands 33 and 34 but to prevent flow of fluid in the opposite direction.

Figure 3:
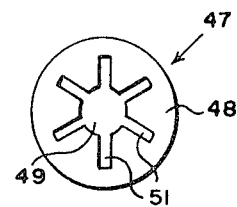
FIG. 3 is an elevation view of a restrictor used in the invention.

Interposed in the conduit 39 between the valve 12 and the load 11 is a restrictor 47. This restrictor is preferably a kind which is constructed so that the pressure drop thereacross is a substantially linear function of the rate of fluid flowing therethrough. Such a restrictor may, as illustrated in FIG. 3, comprise a thin resilient plate 48 formed with a central aperture 49 and also formed with a plurality of slots 51 and extending radially outward from the aperture 49 so as to define flexible vanes or tabs. As more fully described in the copending application of Paul F. Hayner, Ser. No. 188,284 filed 10/12/71 and entitled Variable Fluid Orifice and assigned to the same assignee as is the instant application, such a plate, when suitably designed, constitutes an orifice the area of which varies as the square root of the pressure drop thereacross with the result that the rate of fluid flowing therethrough is a substantially linear function of the pressure drop.

Referring to FIG. 2, the hydraulic amplifier 19 comprises a pair of orifices 53 and 54 connected through restrictors 55 and 56 respectively to the source 39 of fluid under pressure. A wand or flapper, 57 is positioned between the orifices 53 and 54 to be subjected to the jets of fluid issuing therefrom and is moved closer to one or the other of them in accordance with the input signal by means of the torque motor 17. Such motion changes the pressure differential between the conduits 58 and 59 which are connected just upstream of the orifices 53 and 54 respectively, in a well known manner.

The transfer valve 23 comprises a spool including lands 62, 63 and 64 positioned within a hollow cylinder 65. The conduits 58 and 59 are connected to ports so that, in the neutral position of the valve shown, the land 64 just occludes the conduit 58 while the land 63 just occludes the conduit 59. Upon movement of the spool 61 to the left, the conduit 58 communicates with the space between the lands 63 and 64 while the conduit 59 communicates with the space between lands 62 and 63. A conduit 66 communicates permanently with the space between the lands 63 and 64 and also communicates with the end space 44 of the main valve 12. Similarly, a conduit 67 communicates with the cylinder 65 between the lands 62 and 63 and also is connected to the end space 43 of the main control valve 12.

A pair of actuators 71 and 72 engage opposite sides of the flapper 57 nearer the lower end thereof. The actuators 71 and 72 are essentially small pistons which operate in hollow cylinders 73 and 74 respectively. A conduit 75 connects the interior of the cylinders 73 with the load conduit 37 at a point just downstream of the orifice 47. A similar conduit 76 connects the interior of the cylinder 74 with the load conduit 37 at a point just upstream of the orifice 47.

Let us assume that the transfer valve is shifted to the left from the position shown so that the conduits 58 and 59 communicate with the conduits 66 and 67 respectively and with the end spaces 44 and 43. Let it also be assumed that it is desired to move the load connected to the actuator 11 to the right at a uniform velocity. The signal generator 13 (FIG. 1) will then generate a suitable signal calling for such velocity which, of course, is proportional to the rate of flow of fluid through the conduit 37. The torque motor 17 will move the flapper 57 to the right, thereby increasing the pressure in the conduit 59 and end space 43 over that in conduit 58 and end space 44 thereby shifting the main control valve spool 31 to the left and increasing the flow of fluid through the conduit 37 and through the orifice 47 to the load actuator 11. There will, of course, be a pressure drop across the orifice 47 and this is fed by means of conduits 75 and 76 to the actuators 71 and 72. This pressure differential urges the flapper 57 to the left in opposition to the urging of the input signal. The flapper 57 acts as a summer, in effect algebraically adding the input signal from the torque motor 17 to the feedback signal in the conduits 75 and 76, thereby generating an error signal which appears as a difference in pressure in the conduits 58 and 59 which in turn displaces the spool 31 of the main valve accordingly. Soon an equilibrium position is reached with the flapper 57 again centrally located and with equal pressures in the end spaces 43 and 44 and with the spool 31 displaced just sufficiently to cause a flow of fluid through the conduit 37 which exactly corresponds with the input signal. The load device will continue to move to the right at a uniform velocity until the input signal to the torque motor 17 is changed or until the transfer valve 23 removes control from the pilot stage 15.

A pair of orifices 81 and 82 are connected through restrictors 83 and 84 respectively to the source 39 of the fluid under pressure. A flapper 85 is positioned between these orifices to be acted upon by jets therefrom and is moveable from its central position towards one or the other of them by means of the torque motor 18. A pair of conduits 86 and 87 connected just upstream of the orifices 81 and 82 respectively are connected to the cylinder 65 of the transfer valve 23 so that, in the neutral position of the valve shown, the conduits are just occluded by the lands 63 and 62 respectively. Upon movement of the spool 61 to the right, the conduits 86 and 87 communicate with the conduits 66 and 67 respectively and with the end spaces 44 and 43, respectively, of the main valve 12.

A switching valve indicated generally by the reference character 89 is provided to actuate the transfer valve 23 so as to shift control automatically from the pilot stage 15, which is operated by the rate signal, to the pilot stage 16, which is operated by the pressure signal. The valve 89 comprises a sleeve 91 reciprocable in a hollow cylinder 92. The sleeve 91 includes a land 93 on the left end which extends beyond the cylinder 92 and bears against the flapper 85. The sleeve also includes a central land 94, and a land 95 on the right end. The source of pressure 39 communicates with the interior of the cylinder 91 by means of a port 96 in the region of the central land 94. Conduits 97 and 98 communicate with the interior of the cylinder 92 at the regions to the left and to the right of the central land 94 respectively, and also communicate with the end spaces 101 and 102, respectively, of the transfer valve 23. The parts are shown with the flapper 85 in its central position which it occupies in the absence of a pressure error. Under these conditions the sleeve 91 occupies the position shown which is to the left of its central position so that the pressure source 39 communicates, through the port 96 and the interior of the cylinder 92 with the conduit 98 and with the end space 102. Similarly, the land 93 exposes a port 103, connected to the return, thereby connecting the end space 101 to return pressure through the conduit 97. With pressure available at the source 39, the transfer valve 23 would be shifted to the right of the neutral position shown with the result that the conduits 86 and 87 would communicate with the end spaces 44 and 43 so as to control the main valve 12 in accordance with the pressure signal. In this position of the switching valve 89, the land 95 occludes a port 104, connected to the return, but exposes this port when the sleeve 91 is displaced to the right.

A rod 105 extends completely through a central bore of the sleeve 91 and is rigidly fastened thereto. The rod 105 constitutes a feedback actuator and the right end thereof extends slideably into a chamber 106. This chamber is connected by means of a conduit 107 to the load conduit 37 adjacent to the load 11 so as to transfer the pressure acting on the load to the chamber 106. The left end of the actuator 105 extends beyond the sleeve 91 and passes through a clearence hole in the flapper 85 and bears against the actuator of a snap action switch 108. This switch is shown in its actuated position and is released when the rod 105 is displaced to the right.

The switching valve 89 and the switch 108 have been designed for a specific application of the invention. More particularly they are used when it is desired that the velocity of movement of the load closely following an input signal, regardless of pressure variations, until such time as the pressure reaches a preset value after which it is desired that the pressure applied to the load rise gradually (regardless of velocity variations) to a predetermined maximum pressure and that it then be held at that maximum. The switching valve 89 and the switch 108 are used in conjunction with the circuitry shown in FIG. 4 to accomplish this purpose.

Figure 4:
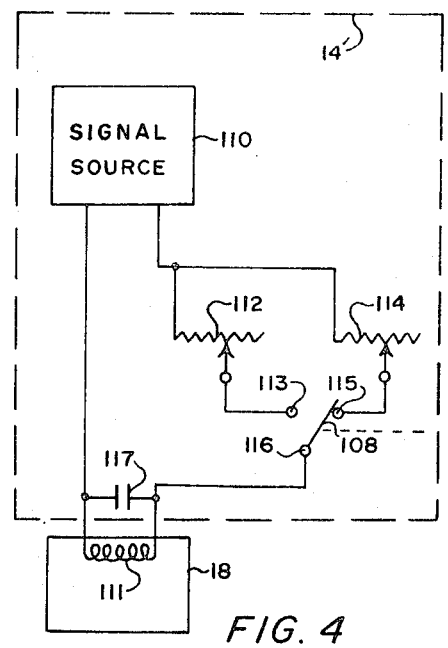
FIG. 4 is an electrical schematic diagram of a portion of the apparatus.

Referring now to FIG. 4, the pressure signal generator 14', includes a signal source 110 which, for the limited purposes of this specific embodiment, may simply comprise an adjustable source of unidirectional voltage. One output terminal of the source 110 is connected directly to one terminal of the winding 111 of the torque motor 18. The other terminal of the source 110 is connected through a first variable resistor 112 to one fixed contact 113 of the switch 108 and is also connected through a second variable resistor 114 to the other fixed contact 115 of the switch 108. This switch is a single pole double throw switch, as shown, and its moveable contact 116 is connected to the other terminal of the torque motor winding 111. A capacitor 117 is connected across the terminals of the winding 111. The switch 108 is controlled by the actuator 105.

Figure 5:
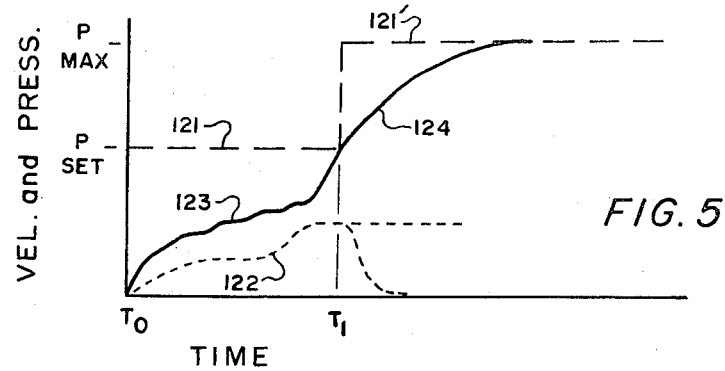
FIG. 5 is a graph useful in explaining the invention.

FIG. 5 shows schematically various signals, velocities and pressures during a typical forging press cycle. The abscissa represents time while the ordinate represents the magnitude of both velocity and pressure. As previously mentioned, the velocity is to be carefully controlled until the pressure rises to the preset value whereupon the pressure is to be controlled until it reaches a maximum value. The dashed curve 121 represents the output of the signal source 110 as modified by the resistor 114, which is initially applied to the torque motor winding 111 and is indicative of the desired preset pressure. However, initially there is no pressure in the load conduit 37 and accordingly none in the chamber 106 with the result that the torque motor 18 urges the flapper 85 and sleeve 91 to the right thereby allowing pressure from the source 39 to flow through the port 96 of the switching valve and through the conduit 97 to the end space 101 of the transfer valve which in turn moves to the left thereby connecting the conduits 58 and 59 to the end spaces 44 and 43 of the main control valve 12 so that the valve 12 is controlled by the velocity signal. The dotted curve of 122 of FIG. 5 represents the desired velocity and this signal is applied to the torque motor 17. The hydraulic amplifier 19 operates in the manner previously explained to control the main valve 12 with the result that the actual velocity closely follows the input signal 122 and may be represented by the same curve. During this time, the actual pressure, as represented by the solid curve 123, may vary but this is of no concern until it rises to the preset pressure at time $T_1$. At this time the pressure in chamber 106 rises sufficiently to urge the actuator 105 and the sleeve 91 to the left, not as far as the neutral position shown in FIG. 2, but far enough to disconnect the pressure source 39 from the conduit 97 and to connect it to the conduit 98. This shift allows pressure to enter the end space 102 of the transfer valve thereby shifting control of the main valve from the hydraulic amplifier 19 to the hydraulic amplifier 20. Additionally, the switch 108 is actuated to remove the resistor 114 from the circuit (FIG. 4) and to substitute the resistor 112. The latter resistor is substantially smaller than the resistor 114 with the result that the voltage across the winding 111 tends to rise suddenly to the maximum value indicated by the portion 121' of the dashed curve. However, the capacitor 117 smooths this rise because the voltage thereacross cannot change instantaneously and accordingly the current actually flowing through the winding 111 rises only gradually, as shown by the curve 124, until it reaches the maximum value. The actual pressure follows this curve very closely. Thus, although switch 108 transfers the resistance value suddenly, the actual current in the torque motor winding and the resulting pressure rise gradually.

As previously noted, the apparatus is designed so that the neutral position of the switching valve 89, when the land 94 is in the center of the port 96, corresponds to a position of the left end of the land 93 which is significantly to the right of the central position of the flapper 85. Thus, as long as the actual pressure in the load 11 and the chamber 106 is substantially less than that called for by the signal to torque motor 18, the rate signal applied to torque motor 17 will control the main valve 12. When the pressure in chamber 106 approaches that called for by the input signal to torque motor 18, which occurs while the flapper is still to the right of its central position, control of the main valve 12 is transferred to the pressure signal applied to torque motor 18. Control by the pressure signal continues to the end of the run.

From the foregoing it will be apparent that Applicant has provided a novel control arrangement. With this invention, it is possible to control the output of a valve so as to make the rate of flow follow an input signal very closely regardless of pressure variations in the load. It is also possible to control the same valve so as to make the output pressure follow an input signal very closely regardless of the rate of flow of fluid. The type of control, rate or pressure, may be selected manually. In addition, Applicant has provided a specific apparatus for a specific purpose in which control is shifted from rate to pressure quickly and automatically.

Although a specific embodiment of the invention has been described in considerable detail for illustrative purposes, many modifications will occur to those skilled in the art. For example, it is obvious that instead of using the three way valve shown in FIG. 2, the invention is equally applicable to a four way valve in which the output may flow in either direction. This could be done quite easily by merely providing a complimentary pressure feedback mechanism. Many other modifications are possible. It is therefore desired that the protection afforded by Letters Patent be limited only by the true scope of the appended claims.

What is claimed is:
1. A valve system, comprising
   a source of fluid under pressure,
   a load,
   a main valve for controlling flow of fluid between said source and said load,
   first and second pilot stages for controlling said main valve alternatively, and
   transfer means for shifting the control of said main valve from one to the other of said pilot stages.
2. A valve system in accordance with claim 1 including first and second sources of input signals for controlling said first and second pilot stages respectively.
3. A valve system in accordance with claim 1 in which said first and second pilot stages are for controlling first and second different conditions of the fluid flowing to said load.
4. A valve system in accordance with claim 3 in which said transfer means is responsive to one of said conditions.
5. A valve system in accordance with claim 3 in which said conditions are rate of flow and pressure respectively.
6. A valve system in accordance with claim 1 in which said first and second pilot stages are each jointly responsive to input and feedback signals indicative of desired and actual values of first and second conditions respectively of the fluid between said main valve and said load.
7. A valve system in accordance with claim 6 in which said transfer means includes means for initially establishing control by said first said pilot stage and for shifting control to said second pilot stage in response to the attainment of a predetermined magnitude of said second condition.
8. A valve system, comprising,
   a source of fluid under pressure,
   a load,
   a main valve for controlling the flow of fluid between said source and said load,
   first and second sources of input signals representing desired values of first and second conditions of fluid flowing to said load,
   means for generating first and second auxiliary signals representing actual values of said first and second conditions respectively,
   first and second pilot stages jointly responsive to said first input and auxiliary signals and to said second input and auxiliary signals respectively for controlling said main valve, and
   transfer means for shifting the control of said main valve from one to the other of said pilot stages.
9. A valve system in accordance with claim 8 in which said first and second conditions are rate of flow and pressure respectively.
10. A valve system in accordance with claim 9 in which said means for generating said first auxiliary signal includes a restrictor having an orifice the effective area of which varies as the square root of the pressure drop thereacross.
11. A valve system in accordance with claim 8 in which said transfer means is responsive to one of said conditions.
12. A valve system in accordance with claim 8 in which each of said pilot stages includes a flapper urged toward one or the other of a pair of oppositely directed nozzles in accordance with one of said input signals and each of which includes means responsive to one of said auxiliary signals for urging said flapper in a direction opposite to that toward which it is urged by said input signal.
13. A valve system in accordance with claim 8 in which said transfer means includes means for initially establishing control by said first pilot stage and for shifting control to said second pilot stage in response to a predetermined magnitude of said second condition.
14. A valve system in accordance with claim 13 in which each pilot stage includes means for generating a differential pressure in a pair of conduits for application to said main control valve and in which said transfer means includes an auxiliary valve for selectively connecting one or the other of said pairs of conduits to said main control valve.
15. A valve system in accordance with claim 14 in which said transfer means includes a switching valve operable in response to the magnitude of said second condition for actuating said auxiliary valve.
16. A valve system particularly suitable for controlling the insertion of the charge into a forging press, comprising,
   a main control valve for supplying fluid through a conduit to said press under controlled conditions of velocity and pressure,
   a first source for a first signal representing the desired variation in velocity of fluid flow under initial conditions,
   a second source for a second signal representing a predetermined threshold pressure, first means disposed in said conduit for generating a third signal indicative of the actual velocity of the fluid flowing therethrough,
second means for generating a fourth signal indicative of the actual pressure in said conduit,
a first pilot stage jointly responsive to said first and third signals for controlling said main valve,
a second pilot stage jointly responsive to said second and fourth signals for controlling said main valve,
transfer means for shifting the control of said main valve from said first to said second pilot stage,
an electric circuit for switching said second signal to a larger value when actuated,
means responsive to the attainment by said fourth signal of a value approaching said threshold pressure for actuating said transfer means and said electric circuit, and
means including a capacitor for smoothing the application of said larger value signal to said second pilot stage,
whereby the fluid flowing to said press flows with a velocity dictated by said first signal until the pressure reaches said threshold value after which the pressure rises gradually to a maximum value corresponding to said larger value of said second signal.

* * * * *